United States Patent [19]

Kanazawa

[11] 4,353,570

[45] Oct. 12, 1982

[54] OIL BRAKE DEVICE FOR USE IN BICYCLES

[76] Inventor: Kuniyoshi Kanazawa, 2-21-5 Nakamiya, Asahi-ku Osaka-shi 535, Japan

[21] Appl. No.: 141,622

[22] Filed: Apr. 18, 1980

[30] Foreign Application Priority Data

Apr. 21, 1979 [JP] Japan ................. 54-49234

[51] Int. Cl.³ .............................................. B62J 1/06
[52] U.S. Cl. .................................. 280/283; 188/272; 267/132; 280/227; 280/275
[58] Field of Search ............... 280/283, 275, 703, 227, 280/220, 221; 248/563; 267/132; 188/272

[56] References Cited

U.S. PATENT DOCUMENTS 4,118,045 10/1978 Kanazawa .......................... 280/283

FOREIGN PATENT DOCUMENTS 34431 4/1925 Denmark ............................ 280/283
495356 11/1938 United Kingdom ................. 280/283

Primary Examiner—John A. Pekar
Attorney, Agent, or Firm—Koda and Androlia

[57] ABSTRACT

This disclosure provides an oil brake device for use in the bicycle in which a saddle support is resiliently suspended independent of a main body frame so as to prevent the transmission of shock and vibrations of front and rear wheels in bicycle riding. The brake device is designed to prevent sharp elevation of the saddle support when the bicycle is stopped, or sharp downward movement of the support when starting from the halted position. The device works in cooperation with the wheel brake.

5 Claims, 6 Drawing Figures

OIL BRAKE DEVICE FOR USE IN BICYCLES

BACKGROUND OF THE INVENTION

1. Field of the Invention

This invention relates to an oil brake device for bicycles and more particularly to an oil brake device for bicycles to make the saddle frame temporarily immovable with respect to the main body frame.

2. Prior Art

The present applicant previously made public Japanese patent publication No. 580/1979, U.S. Pat. No. 4,118,045, British Pat. No. 1557262 and Japanese Utility Model Publication No. 53240/1978 concerning bicycles in which such a floating frame unit was separated from the main body frame and resiliently suspended thereon. This invention is intended to provide a bicycle which is improved in safety and in comfortable ride over those previous inventions. A description will now be given both of the structure and disadvantages of the bicycles that have afforded a basis for this invention and of the construction of the invention.

In the bicycle disclosed in Japanese Patent Publication No. 580/1979, U.S. Pat. No. 4,118,045 and British Pat. No. 1557262, as shown in FIG. 1, a floating frame unit 20 comprises a saddle support 14 and a horizontal member 15 both secured to the unit 14; said support having a saddle 12 at the upper end and a rear wheel driving gear means 16 at the lower end thereof, said member having forked portions 6 and 6' at the front end thereof, said portions being formed integrally with upward bent portions 9 and 9' having sub-handles 10 and 10' rotatably mounted thereto, said sub-handles having handle insertions tubes 171 and 171' secured thereto. The floating frame unit is constructed independent of a main body frame 21 made up integrally of upper forked portions 7 and 7' and lower forked portions 8 and 8', upper and lower horizontal bars 5 and 5' and a handle insertion tube 19. The upper forked portions 7 and 7' are connected through spring means 13 and 13' to arms 11 and 11' projecting from the saddle support 14 and an upper horizontal bar 5' is at its intermediate point 151 connected through a spring means 150 to the saddle support 14. Furthermore, a point 14' on the lower horizontal bar 5 is rotatably connected by a link 153 to a point 152 on the saddle support 14. Accordingly, the floating frame unit 20 is resiliently suspended independent of the main body frame 21 and is permitted not only to make independent vertical movement but also to swing back and forth with the point 152 as a center. A handle bar 2 is inserted into the handle insertion tube 19 and is provided at the lower end with a front wheel 1 and formed integrally with the main body frame 21. To the sub-handles 10 and 10' which form part of the floating frame unit 20 are secured handle insertion tubes 171 and 171' each on the left and right, and the ends of a lever 4 pass respectively through the insertion portions 170 and 170' of the handle insertion tubes. Accordingly, when the sub-handles 10 and 10' are moved with the upward bent portions 9 and 9' forming the center of rotation of the sub-handles as a center, the handle lever 4 passing through the handle insertion tubes 171 and 171' formed integrally with the sub-handles are also moved around the handle bar 2 and consequently a front wheel 1 connected to the lower end of the handle bar 2 is rotated to change the direction of movement of a cycle.

Referring now to the bicycle which is disclosed in Japanese Utility Model Publication No. 53240/1978, the bicycle therein dispenses with the handles 10 and 10' and handle insertion tubes 171 and 171', horizontal bar 15, forked portions 6 and 6', upward bent portions 9 and 9' which are used in the bicycle disclosed in the preceding invention in Japanese patent publication No. 580/1979, shown in FIG. 1. The handle 4 is controlled directly by hand in the same manner as that of the bicycle generally used.

In the bicycle of the kind described above, the saddle support 14 is independent of the main body frame 21 and resiliently suspended on the frame 21 by spring means 13 and 13', and accordingly when a rider rests his weight on the saddle, the whole of the saddle support is lowered but when he rests one foot on the ground so as to stop the bicycle for example on the red traffic light, the body weight resting on the saddle support is decreased as that much and the saddle support is elevated. When the rider restarts in such an unstable state, he feels it difficult to poise himself, which is dangerous for the rider. The present inventor therefore manufactured on an experimental basis a device for applying the brake to the wheel of a bicycle and simultaneously to the saddle support so as to prevent the saddle support from being elevated when the bicycle is stopped. The inventor made various experiments on the device and completed a mechanical brake and filed Japanese Utility Model Application No. 18797/1977 for the brake. Later on, the Applicant found the following drawbacks in the brake. Namely, application of the brake with respect to the saddle support is effected by the control of the brake lever mounted to the handle, but the mechanical brake makes it necessary to use an exceedingly great amount of force for simply braking the saddle support. Secondly, the force applied to the brake lever is dividedly imparted to the saddle support brake and wheel brake, with the result that the wheel brake is reduced in working. Thirdly, provision of independent brake levers for the saddle support and the wheel complicate brake manipulation, which invites increased danger. Such are the drawbacks. In order to obviate such disadvantages, various improvements have been made and consequently the oil brake device proposed in the present application has been found free from the disadvantages.

SUMMARY OF THE INVENTION

A primary object of the invention is to provide an oil brake device for preventing the saddle support from being elevated when a bicycle is temporarily stopped.

Another object of the invention is to provide a positive oil brake device which never fails to function.

Still another object of the invention is to provide an oil brake device which works effectively by application of slight force.

Yet another object is to provide an oil brake device which works on the saddle support simultaneously with or prior to the application of the wheel brake and which releases braking of the saddle support simultaneously with or subsequently to releasing of the wheel brake.

Still a further object of the invention is to provide an oil brake device which also functions as a damper for the saddle support.

Yet a further object is to provide an oil brake device which does not prevent the saddle support from being lowered even upon application of the brake.

Yet a further object of the invention is to provide an oil brake device which functions as a shock absorber with respect to the sharp movement of the saddle support.

In keeping with the principles of this invention, the objects are accomplished by a unique structure where a floating frame unit comprising a saddle, a saddle support and a rear wheel driving gear means is separated from a main body frame having a rear wheel frame, an intermediate frame and a handle bar insertion tube and is suspended resiliently on the main body frame, said brake device being designed to make the saddle frame temporarily immovable with respect to the main body frame.

A more specific description will now be given, by way of example, of the structure of the invention embodied in one preferred form which is illustrated in the accompanying drawings.

DETAILED DESCRIPTION OF THE INVENTION

Figure 2:
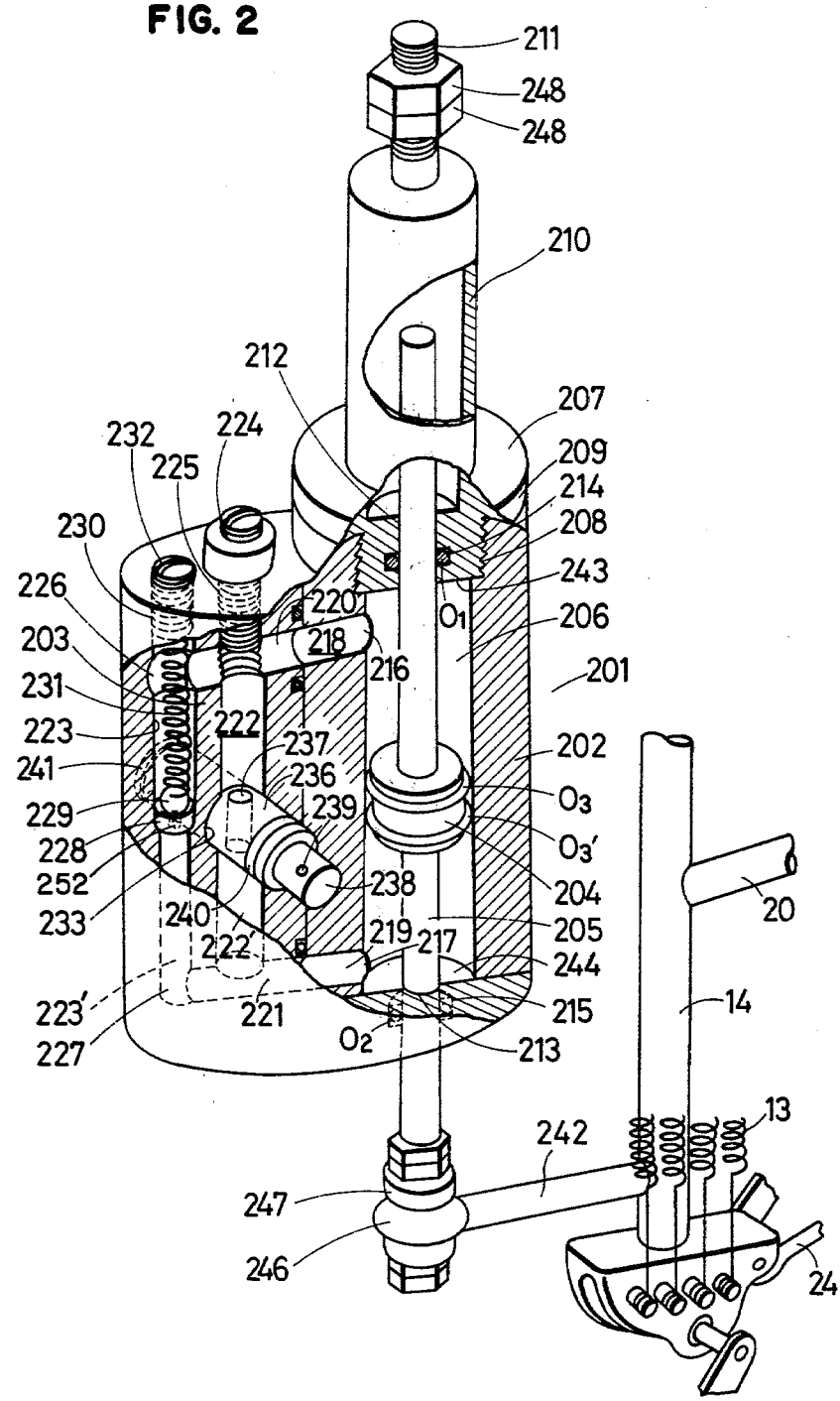
FIG. 2 is a perspective view, broken in part, of the oil brake unit of the invention.
Figure 3:
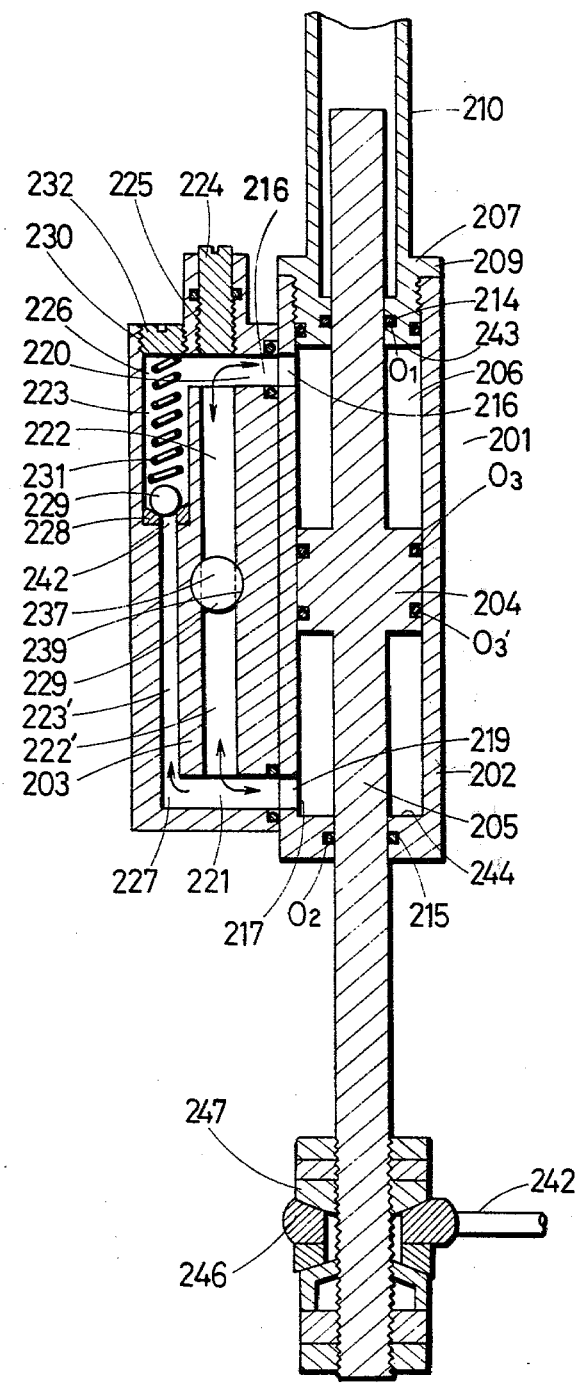
FIG. 3 is a longitudinal sectional view of the oil brake unit for the invention.

As shown in FIGS. 2 and 3, according to the invention, an oil brake unit 201 is divided into a cylinder casing 202 and a valve casing 203 and in FIG. 2 both casings are fixed to each other by bolts not shown. The cylinder casing 202 has a cylinder chamber 206 through which a piston rod 205 having a piston 204 in the center thereof passes substantially parallelly to the saddle support 14 and which is slightly longer in stroke than the vertical movement of the saddle support 14 and which has an inner diameter slightly larger than an outer diameter of the piston 204. The cylinder chamber 206 is covered on the top by a cap 207 secured to the cylinder casing 202. The cap 207 has a threaded portion 208 at the end, a flange 209 extending thereto and a hollow cylinder portion 210. The cylinder portion 210 is closed at the top end and has a threaded rod portion 211 extending upward from the closed top end. The cap 208 and the cylinder chamber 206 are provided at their ends respectively with through holes 212 and 213 which are in alignment with the axis of the piston rod 205 and which has slightly larger inner diameters respectively than the outer diameter of the piston rod 205. The piston rod 205 passes through O-rings $0_1$ and $0_2$ fitted into O-ring grooves 214 and 215. The outer periphery of the piston 204 are encircled with O-rings $0_3$ and $0'_3$ and the O-rings $0_3$, $0'_3$ are in close contact with the inside wall of the cylinder chamber 206. Two oil passages 218 and 219 formed in the upper end portion 216 and the lower end portion 217' of the cylinder chamber 206 are provided toward the center of a valve casing 203 at right angles with the axis of the cylinder chamber 206. On the other hand, two oil passages 222 and 223 are longitudinally provided inside the valve casing 203, and further two horizontal oil passages 220 and 221 different from the preceding oil passages 218 and 219 are provided. The passage 220 of the oil passages 220 and 221 communicates with the passage 218 and the passage 221 communicates with the passage 219. The passage 222 communicates at the lower end with the passage 221 and intersects intermediately the passage 220 and is provided at the upper end with a partition screw 224 and closed by the screw. The female thread portion 225 having the screw 224 engaged therewith extends to the portion normal to the passage 220. When the screw 224 is screwed far down to its lowermost end, the passage 220 is completely closed. On the other hand, the oil passage 223 intersects at the lower end at point 227 with the oil passage 220 and communicates therewith, and interesects at the upper end at point 226 with the oil passage 220. In the intermediate between the intersection points 226 and 227 there is provided a valve seat 228 having a valve ball 229 seated on the bowl-like head of the seat. The oil passage 223 is provided at the upper end with a threaded portion 230 and is opened. Into the threaded portion 230 is inserted a screw 232 which presses a compression spring 231 against the valve 229 and which closes the oil passage 220. In the intermediate portion of the passage 222, namely in the area extending between the passages 220 and 221, a main valve insertion hole 233 intersecting at right angles with the passage 222 and passing through the axis of the passage 222 and transversely through a valve casing 203 and on the inner circumference of the main valve hole 233 are provided O-ring grooves 234 and 235 with the passage 222 intervening therebetween, and O-rings $0_4$ and $0_5$ and fitted into the grooves (See FIG. 6). The main valve 236 is tightly fitted into the main valve insertion hole 233 and has a valve hole 237 formed at point intersecting with the passage 222. The valve hole 237 passes through the valve 236 in the direction at right angles with the axis of the valve 236. The valve is also formed in the portion 238 projecting from a valve casing 203 with a lever insertion hole 239 for receiving a lever 245 thereinto for rotating the main valve 236. The valve is also formed in the portion 238 projecting from a valve casing 203 with a lever insertion hole 239 for receiving a lever 245 thereinto for rotating the main valve 236 (See FIG. 5), the lever insertion hole 239 passing through the portion 238 at right angles with the axis thereof. The numerals 240 and 241 designate ring-like grooves adapted to receive stop rings thereinto for preventing axial movement of the main valve 236.

A description will now be given of the operation of the oil brake device of the invention. When a bicycle is in a normal state of running along the road, the saddle support 14 of the bicycle moves up and down in response to the irregularities of the road and a piston rod 205 and piston 204 connected to a rod 242 move up and down inside the cylinder chamber 206 in accordance with the vertical movement of the saddle support 14. In this state, a valve hole 237 faces in the same axial direction as the axis of the oil passage 222 as shown in FIG. 2. Accordingly, the main valve 236 is in such a state that, for example when the piston 204 is lowered in accordance with the lowering of the saddle support 14, the oil inside the cylinder chamber 206 is pressed by the piston 204 and passes through the oil passages 219, 221 and the lower passage 222' of the oil passages 222, 220 and 218 to the cylinder chamber 206. Accordingly, the saddle support 14 is allowed to move up and down freely. When a brake lever (not shown) for stopping the wheel is operated to stop the bicycle, a lever 245, (FIG.

Figure 4:
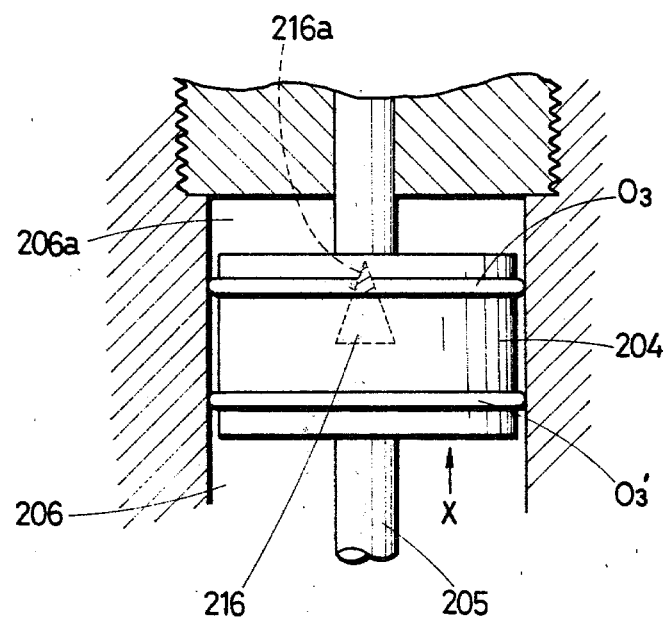
FIG. 4 is a fragmentary longitudinal sectional view showing the orifice effect of an inlet-outlet port.

5) interlocking with the brake lever, as apparent from the description to be later given, rotates the main valve 236 through about 90° to thereby close the valve hole 237 with the inner wall of the main valve insertion hole 233 and to stop the flow of oil to thereby stop the piston 204. Since the oil brake unit 201 is fixed to the main body frame 21, the saddle support 14 is also made immovable with respect to the main body frame 21. But when in operation of the brake lever for stopping the wheel, the piston 204 is not in its lowermost position but in the intermediate position of the cylinder chamber 206, the oil below the piston 204 is depressed by the body weight of the rider resting on the saddle 12, flows through the oil passages 219 and 221 into the lower portion 223' of the oil passage 223, passes through the hole 252 formed through the center of the valve seat 228, pushes away the valve ball 229 against the action of compression spring 231, and flows into the oil passage 223 and thereafter through the passages 220 and 218 and back into the cylinder chamber 206, with the result that the piston 204 and saddle support 14 are enabled to be lowered. But because the valve 229 is unable to work against the flow of oil in the opposite direction in which to elevate the piston 204, the piston 204 can be lowered but cannot be elevated as long as the brake lever is kept operated. In this manner, the valve ball 229 functions as a check valve. Also, since the readiness with which the valve ball 229 moves dependes upon the depressing force of the compression spring 231, how far the screw determining the amount of deflection of the compression spring 231 advances threadably into the threaded portion 230 makes it possible to control how large an amount of load applied to the saddle 12 can lower the saddle support 14 even if the brake is kept applied. Also, advancement of the screw 224 along the threaded portion 225 gradually closes the oil passage 220 until finally the oil passages 222, 223 and 220 are completely partitioned. Accordingly, change in the degree of advancement of the screw 224 changes the line opposition of the oil passage 220, and the screw 224 along with the viscosity of flowing oil can function as a gate valve which provides a damper effect to suppress sharp movement of the piston 204. Furthermore, designing of the shape of oil inlet-outlet ports 216 and 217 to the cylinder chamber 206 produces an effect as an orifice. Namely, dotted line in FIG. 4 shows an imaginary triangle shape of oil inlet-outlet ports 216 and 217 (the inlet-outlet port 216 along is shown in FIG. 4). When the piston 204 moves in the direction indicated by arrow X, the oil inside the upper part 206a of the cylinder chamber 206 flows to an oil passage 218 from the port 216a of the oil inlet-outlet port 216 which is shown in the slant line above O-ring $0_3$, but because the port 216a is gradually closed in accordance with the elevation of the piston 204, flowing the oil passage 218 is prevented and the piston 204 is reduced in the speed of elevation until it is finally stopped. Such an orifice effect of the inlet-outlet ports 216 and 217 prevents the piston 204 from striking against the upper end face 243 and lower end face 244 of the cylinder when the piston is moved to the uppermost and the lowermost part of the cylinder. In this manner, the piston 204 is stopped gently in its extreme positions under the effect of a so-called shock absorber. Such an effect depends upon the longitudinal sectional shape of the inlet-outlet ports 216 and 217, and a round, rectangular, oval or square sectional shape may also produce an effect in its own way but, as shown in FIG. 4, the triangle which is reduced in the sectional area of effective opening in proportion to the elevation of the piston 204 inside the cylinder chamber 206 provides the most gentle damping effect. On the contrary, all that is necessary with respect to the inlet-outlet port 217 is to reduce the sectional area of effective opening in proportion to the downward movement of the piston inside the cylinder chamber. The oil brake unit 201 is fixed to the main body frame by threaded portion 211 and the nuts 248 and 248 threadedly fitted thereover.

Figure 5:
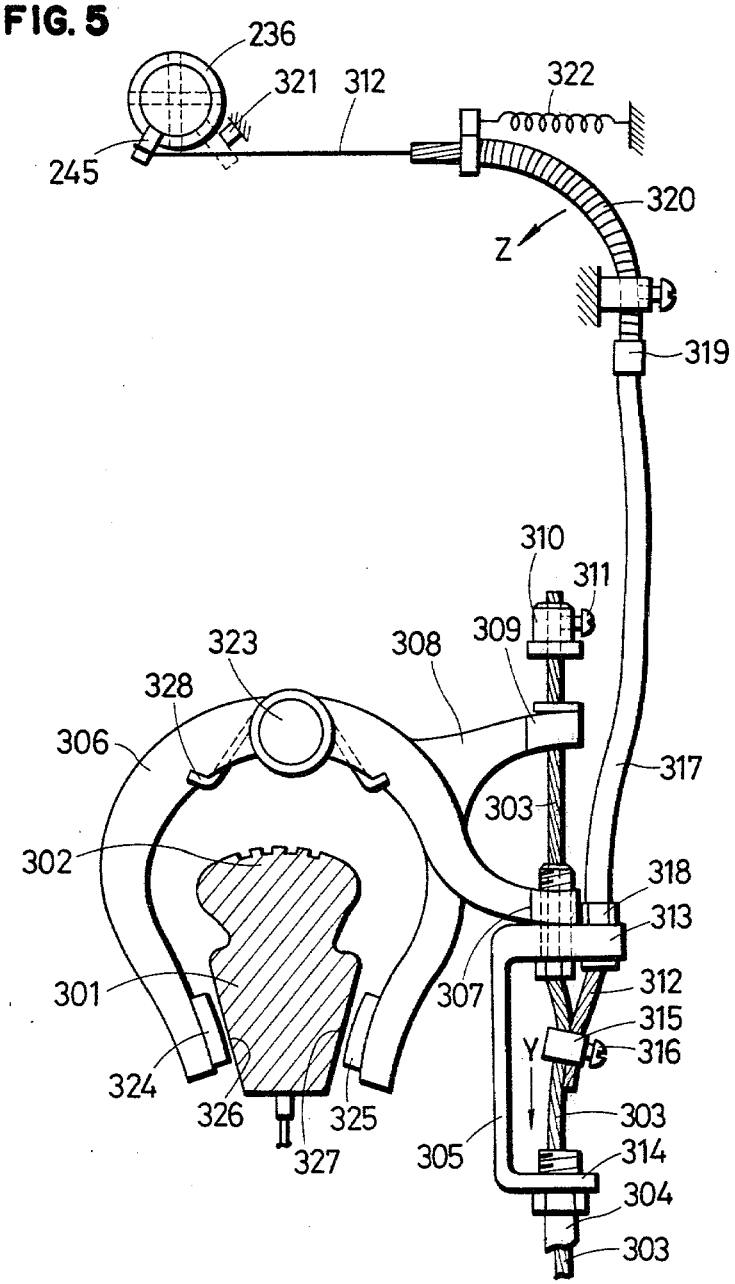
FIG. 5 is a diagram explaining the state of correlative operation between the main valve and wheel brake.
Figure 6:
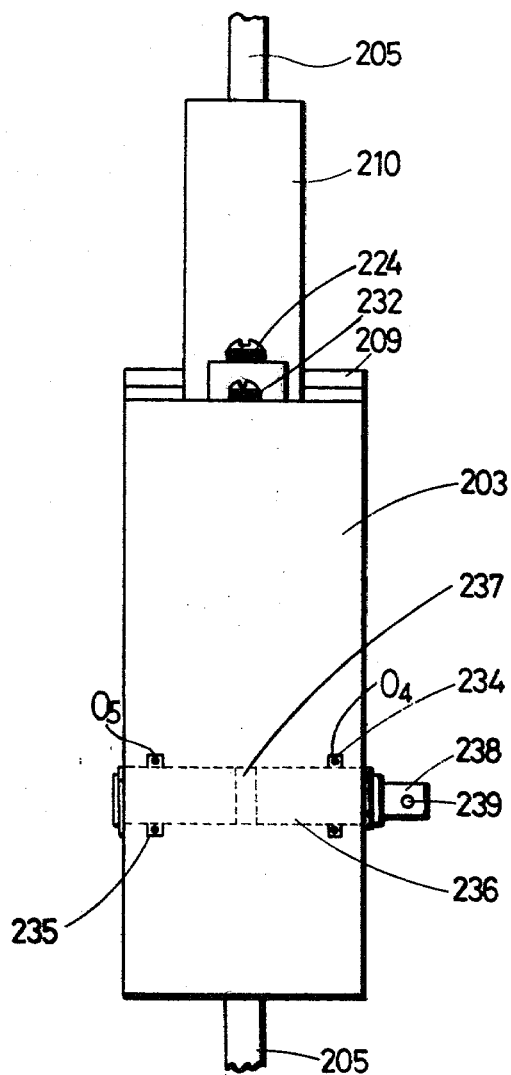
FIG. 6 is a side view of the oil brake unit.

Operational relation between the main valve 236 of the oil brake and the wheel brake will now be described with reference to FIG. 5. In FIG. 5, the numeral 301 designates a wheel with a tire 302. A wire 303 is connected at one end to the brake lever provided on the handle and passes through a tube 304 and further through a connection fitting 305 and through a fastener 307 provided on the base of the left side brake arm 306 and further through the base 309 of the right side brake arm 308 and has a stopper 310 secured to the wire by a screw 311. On the other hand, another wire 312 is fixed at one end to the wire 303 by a fastener 315 and a screw 316 between the U-shaped arms 313 and 314 of the connection fitting 305. Also, a tube 317 is at one end fixed to the arm 313 of the connection fitting 305 by a fastener 318 and is at the other end connected to a flexible tube 320 by a fastener 319. On the other hand, a wire 312 fixed at one end to the wire 303 extends through the fastener 318 and through the tube 317 and via the fastener 319 and passes through the flexible tube 320 and is fixed at the other end to a lever 245 fitted into a lever insertion hole 239 formed in the main valve 236.

Figure 1:
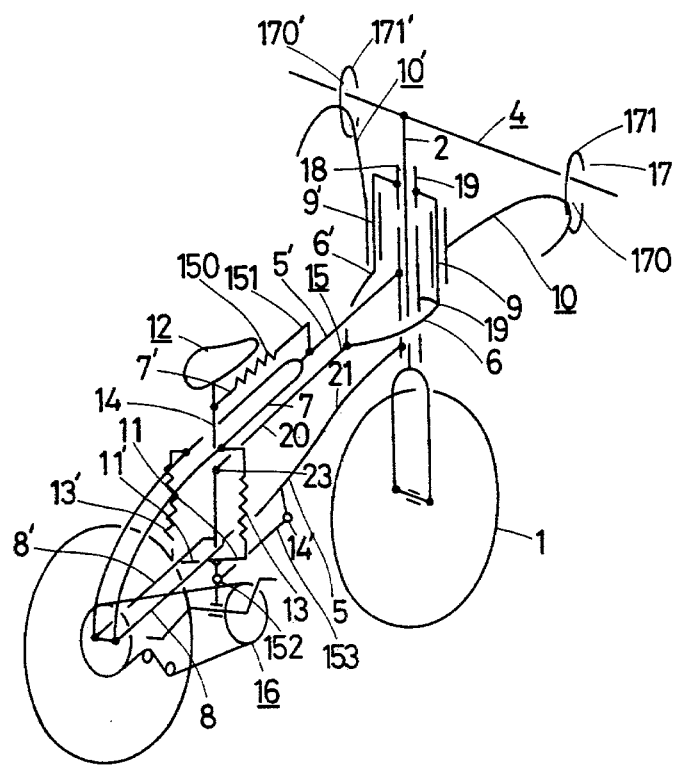
FIG. 1 is a diagrammatic representation of the independently suspended saddle support bicycle affording a basis for the invention.

Accordingly, when the rider pulls the brake lever to stop his bicycle, the wire 303 is pulled in the direction indicated by arrow Y and the wire 313 is at the same time pulled and slid through the tube 317, with the result that the lever 245 fixed to the end of the wire 312 and the main valve 236 are rotated around the axis of the main valve 236 through 90° to thereby move the lever 245 to abut against the stopper 321 to stop rotation. Accordingly, the valve hole 237 (FIG. 2) is also rotated through 90° to block the oil passage 222 and to make the saddle support 14 immovable with respect to the main body frame 21. Furthermore, pulling of the brake lever prevents the main valve 236 from rotating further, so that the flexible tube 230 containing the wire therein deflects in the direction indicated by arrow Z. In order to make this process positive, it is desirable to pull the terminal end of the flexible tube 320 by a spring 322. On the other hand, the wire 303 kept pulled together with the wire 312 is slid through the fastener 307 and through the base 309 of the right side brake arm 308 to pull a fastener 310 toward the right side brake arm 308 until the fastener 310 engages the base 309. The left and right brake arms 306 and 308 are at the intermediate point inserted around a pin 323, and when the wire 303 is pulled further, both brake arms are rotated around the pin 323 to thereby bring each brake show 324 and 325 secured to the terminal end of each brake arm into contact with each side 326 and 327 of the wheel 301, and stronger pulling of the wire 303 brakes the wheel to stop the bicycle. In this manner, the bicycle is stopped and the saddle support 14 is simultaneously made immovable, and when the piston 204 is in the intermediate of the cylinder chamber 206, the saddle support 14 is lowered to its lowermost position by the body weight of the rider through the intermediary of the check valve ball 229. When it is desired to start the bicycle, the force applied to the brake lever is slackened. Then, both brake arms 306 and 308 are widened in space by a brake releasing spring 328 to release braking of the wheel 301. But at this point of time also the wire 312 is kept pulled by the lever 245 through the restoring force of the flexible tube 320, but when the force applied to the brake lever is further slackened, the flexible tube 320 is completely restored to its original position and thereafter the lever 245 is rotated by being pushed and the main valve 236 is restored to its original position, with the result that the saddle support 14 becomes unable to freely move up and down. In the embodiment illustrated, for the convenience of manufacturing, the cylinder casing 202 and the valve casing 203 are provided in a divided form. Also, since there is also a case (see Japanese patent publication No. 580/1979) wherein the saddle support 14 is vertically moved and swung back and forth with a point 152 as a center (see FIG. 1), a rod 242 and piston rod 205 cannot be rigidly connected to each other, and consequently, the saddle support 14 is arranged to oscillate freely around a spherical socket 246 by the combined use of the spherical socket 246 and a spherical journal 247 (see FIG. 3).

As described above, this invention is an oil brake device which contributes greatly toward the increased safety and comfortable ride of the rider in that even when the rider stops his bicycle temporarily and raises his hips, he is free from the danger of losing balance by the saddle being elevated and use of slight force positively prevents the saddle support from rising without impeding braking force with respect to the wheel and in that even while the brake is working, the saddle is lowered to the lowest position in which the rider finds it most convenient to ride on the bicycle when he rests his body weight on the saddle and in that the rider is able to apply the brake to the saddle support before braking the wheel and to release the wheel brake before starting the bicycle and to release the saddle support brake thereafter, thus causing the brake to function also as a saddle support damper and to bring about a shock absorber effect on the sharp movement of the saddle support. In this manner, the invention enlarges the scope of application of the prior art and increases the aptitude of the application.

I claim:

1. An oil brake device for use in bicycles wherein a saddle support is suspended independent of a main body frame, said saddle support having a saddle and a rear wheel driving gear means secured respectively to the upper and the lower ends of said saddle support, said oil brake device comprising an oil cylinder having upper and lower ends with said upper end of said cylinder being adjacent said upper end of said saddle support, a piston rod provided in said cylinder moving together with said saddle support, an oil passage opened at and communicating with the upper and lower ends of the cylinder chamber of said oil cylinder thereby establishing an oil circuit with the oil cylinder chamber, and a main valve located in said oil passage and operated together with a wheel brake to block the flow of oil inside the oil passage by operating the wheel brake and to permit the flow of oil by releasing the brake.

2. An oil brake device for use in bicycles according to claim 1, wherein said oil passage having said main valve is connected to a bypass oil passage having a check valve means, said valve means permitting the flow of oil only in the direction in which said piston rod is allowed to move downward after the flow of oil in said oil passage has been blocked.

3. An oil brake device for use in bicycles according to claim 1, wherein a gate valve means is provided in an intermediate portion of said oil passage opened at and communicating with the upper end of said cylinder chamber of the passage containing said main valve therein, thereby damping the sharp vertical movement of said piston rod.

4. An oil brake device for use in bicycles according to claim 1, wherein an inlet-outlet port opened at and communicating with the upper or lower end of said cylinder chamber of the oil passage containing said main valve therein is gradually reduced in cross section in response to the upward or downward movement of a piston, thereby slowing the speed of said piston before said piston is stopped.

5. An oil brake for use in bicycles according to claim 1, wherein said main valve is fitted with a wire for manipulating the main valve, said wire is connected to a wire for manipulating said wheel brake and a resilient member is interposed between the point of connection and said main valve, whereby, when said wheel brake manipulating wire is manipulated, said main valve is rotated to block the flow of oil in said oil passage and to elastically deform said resilient member after said blockage, and when said wheel brake manipulating wire is released, said main valve is restored to its original position through the elastic restitution of said resilient member.

* * * * *